United States Patent
Morris et al.

(10) Patent No.: US 7,156,011 B2
(45) Date of Patent: Jan. 2, 2007

(54) DEPTH LIMITING SAFEGUARD FOR CHANNEL MACHINING

(75) Inventors: Tony Morris, Simi Valley, CA (US);
Mike Hankins, Simi Valley, CA (US);
Fritz Kuck, Westlake Village, CA (US);
Kenny Smith, Santa Clara, CA (US);
Dave Campbell, Simi Valley, CA (US);
Doug Coutts, Simi Valley, CA (US);
Rich Folster, Simi Valley, CA (US);
Jeff Fint, Granada Hills, CA (US);
Chad Schepel, Newbury Park, CA (US)

(73) Assignee: The Boeing Company, Chicago, IL (US)

( * ) Notice: Subject to any disclaimer, the term of this patent is extended or adjusted under 35 U.S.C. 154(b) by 336 days.

(21) Appl. No.: 10/787,027

(22) Filed: Feb. 25, 2004

(65) Prior Publication Data
US 2005/0183562 A1  Aug. 25, 2005

(51) Int. Cl.
*B26D 3/06* (2006.01)
*B26D 5/00* (2006.01)

(52) U.S. Cl. .............. 83/876; 83/63; 83/360; 83/664; 83/875; 83/881; 409/218

(58) Field of Classification Search .............. 83/881, 83/63, 360, 664, 875, 876; 144/237; 409/218
See application file for complete search history.

(56) References Cited

U.S. PATENT DOCUMENTS

| | | | | |
|---|---|---|---|---|
| 1,751,568 A | * | 3/1930 | Winkley | 83/63 |
| 2,831,514 A | * | 4/1958 | Avard | 83/875 X |
| 2,941,560 A | * | 6/1960 | McCaffery | 83/882 |
| 4,470,345 A | * | 9/1984 | Miyata | 83/876 X |
| 5,860,348 A | * | 1/1999 | Morse et al. | 83/881 X |
| 5,941,151 A | * | 8/1999 | Amon et al. | 83/360 |

* cited by examiner

*Primary Examiner*—Clark F. Dexter
(74) *Attorney, Agent, or Firm*—Wildman Harrold Allen & Dixon; Timothy K. Klintworth; Gary R. Gillen

(57) ABSTRACT

A channel cutting tool may include an arbor that connects to a rotating spindle of a machining tool or a similar spinning part of a machining tool. Two slot cutting blades may be fixedly mounted to the arbor. An inner washer may be fixedly mounted on the arbor between the cutting blades and establish the blade spacing. An outer washer may be rotationally mounted to the inner washer with a smaller thickness to facilitate rotation relative to the two cutting blades. The arbor rotates about a longitudinal rotation axis, which also may be the rotation axis for the cutting blades, the inner washer, and the outer washer. The outer washer functions as a depth-limiting safeguard for the channel cutting tool.

8 Claims, 4 Drawing Sheets

DEPTH LIMITING SAFEGUARD FOR CHANNEL MACHINING

FIELD OF THE DISCLOSURE

The present disclosure is generally related to channel machining, and more particularly, to a depth limiting safeguard for channel machining.

BACKGROUND

Rocket engine combustion chambers and nozzles are typically exposed to high velocity gases at temperatures in excess of 3300° C. (6000° F.) for long periods. To cool the walls closely exposed to the hot gas, closely spaced channels are typically provided in the walls for coolant flow. The channels are connected at the channel ends and are supplied with coolant from a manifold. The coolant circulates in the channels to cool the wall material during operation.

The channels can be manufactured by a number of well known methods. One such method entails using a machining tool to machine the cooling channels on the exterior of the combustion chamber or nozzle liner. Channel machining tools typically operate a rotating spindle that includes one or more slot cutting blades that cut one or more channels concurrently. The machining tool provides spindle rotation of the slot cutting blades and special movement thereof along a desired channel profile. The depth of the cutting blade can be adjusted manually by an operator or automatically by the machining tool based on numerically defined profile.

Because of the very harsh thermal environment encountered by rocket engine combustion chambers, the remaining wall thickness at the bottom of the channel being cut can be as small as 0.020 inches to adequately cool the wall exposure to the hot gas. On the large diameter chambers or nozzles, the small remaining wall thickness results in a very flexible structure that does retain its intended reference shape during the channel cutting operation. When a channel machining tool is cutting channels that extend from the forward section to the aft section of the part, flexibility of the inner wall may cause the cutting blades to cut the channels deeper than a desired depth resulting in the remaining wall thickness being too small. Other factors, such as movement of the part on its mandrel during channel machining may also cause the channels to be cut deeper than desired. As a result, the undersize wall thickness may render combustion chamber or nozzle unusable.

SUMMARY

A channel cutting tool comprises an arbor rotatable about a longitudinal axis, a pair of cutting blades fixedly mounted to the arbor and adapted to rotate with the arbor about the longitudinal axis, and at least one washer disposed between the cutting blades and being concentric with the cutting blades. The washer is adapted to be freely rotatable relative to the arbor. A radius of the washer is smaller than a radius of the cutting blades.

A tool for cutting channels in a liner of a rocket engine combustion chamber or rocket engine nozzle includes an arbor rotatable about a longitudinal axis, a pair of cutting blades, an inner washer, and an outer washer. The pair of cutting blades are fixedly mounted to the arbor and adapted to rotate with the arbor about the longitudinal axis. The inner washer is fixedly mounted to the arbor between the cutting blades establish the cutting blade spacing and concentric with the cutting blades. The outer washer is rotatably mounted to the inner washer between the cutting blades and is concentric with the inner washer. The outer washer has a smaller radius than a radius of the cutting blades. A difference between a radius of the cutting blades and a radius of the outer washer substantially defines a depth limit of the channels cut in the liner by the pair of cutting blades.

A method of cutting channels in a liner of a rocket engine combustion chamber or a rocket engine nozzle comprises rotating a cutting tool, cutting the liner along a channel direction at a cutting depth with the cutting tool, and limiting the cutting depth. The cutting tool includes a pair of cutting blades. The rotating of the cutting tool causes the rotating of the cutting blades. At least one washer is disposed between the cutting blades and is concentric with the cutting blades, the washer is freely rotatable relative to the cutting blades. A radius of the washer is smaller than a radius of the cutting blades. When cutting the liner, the cutting causes each cutting blade to cut a channel in the liner. When limiting the cutting depth, a perimeter surface of the washer contacts a portion of the liner between the channels cut by the pair of cutting blades thereby limiting the cutting depth.

A rocket engine combustion chamber and a rocket engine nozzle comprises a jacket and a liner that is attached to the jacket. The liner includes a plurality of channels. Each channel is manufactured by a cutting tool having at least a cutting blade and a washer adjacent and concentric with the cutting blade. During channel cutting, the washer freely rotates relative to the cutting blade and contacts the liner to limit a cutting depth of the cutting blade.

The features, functions, and advantages can be achieved independently in various examples of the present disclosure or may be combined in yet other examples.

DETAILED DESCRIPTION

Figure 1:
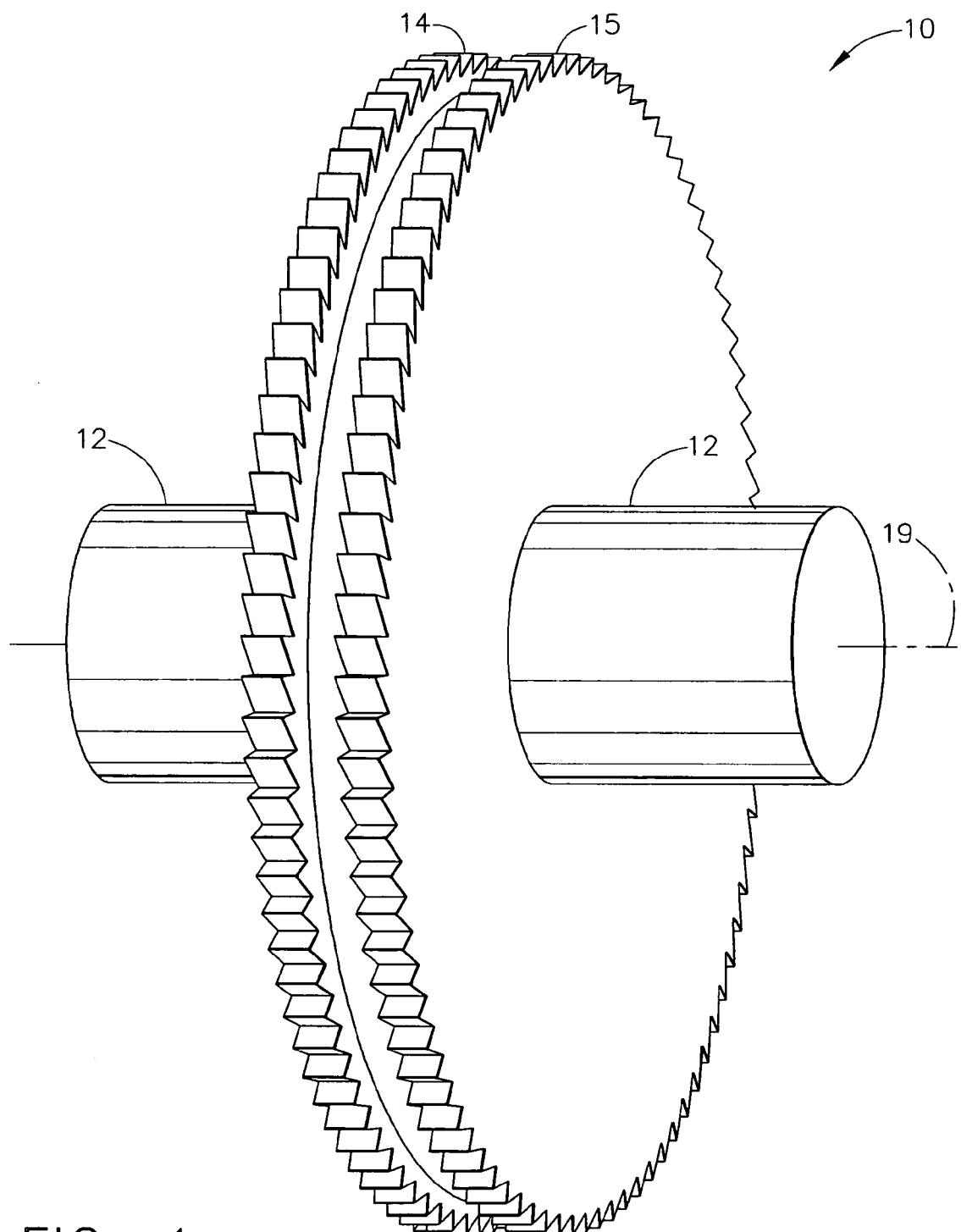
FIG. 1 is a perspective view of a first exemplary channel cutting tool constructed in accordance with the teachings of the present disclosure.
Figure 3:
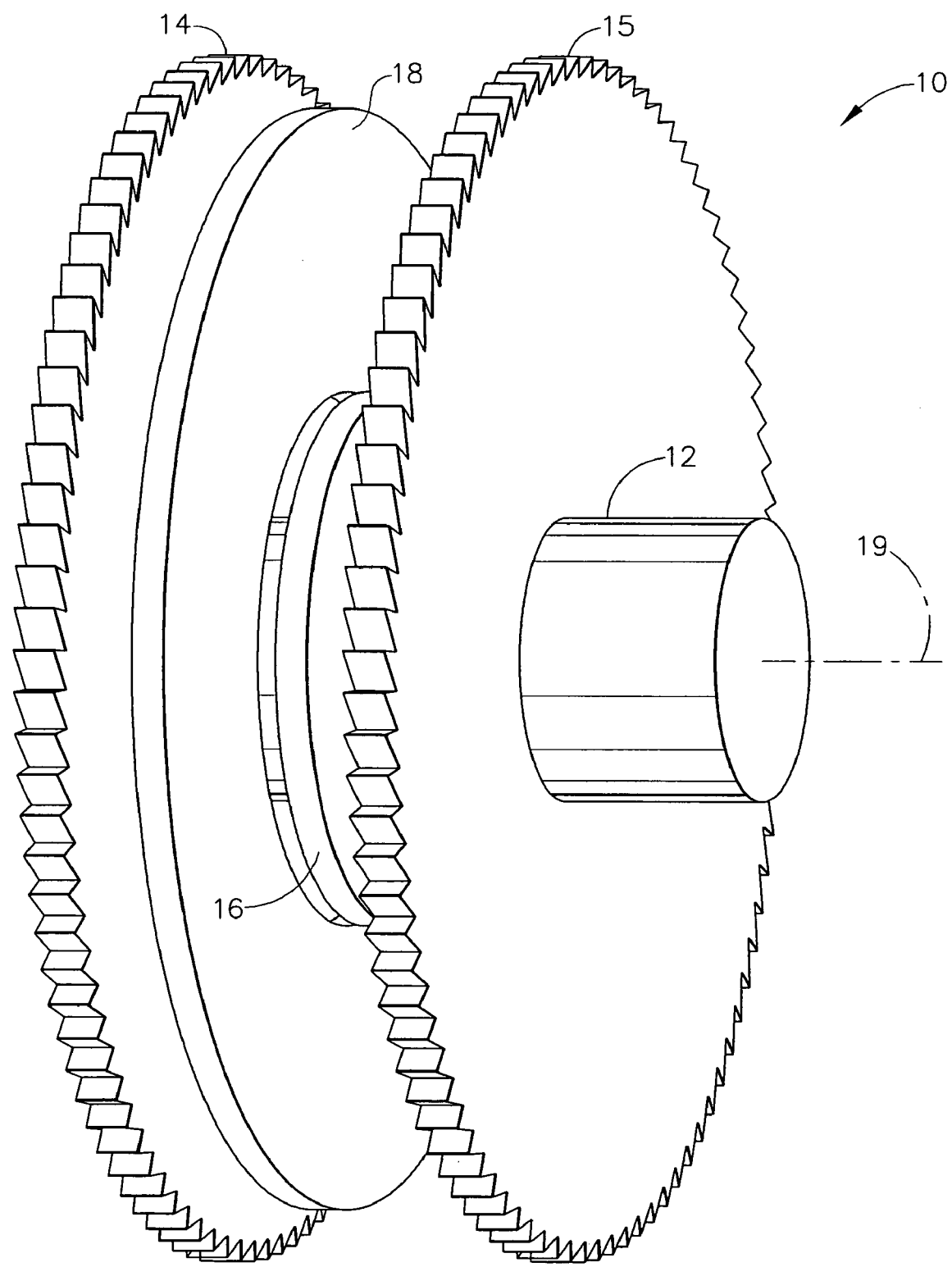
FIG. 3 is an exploded view of the channel cutting tool of FIG. 1.
Figure 4:
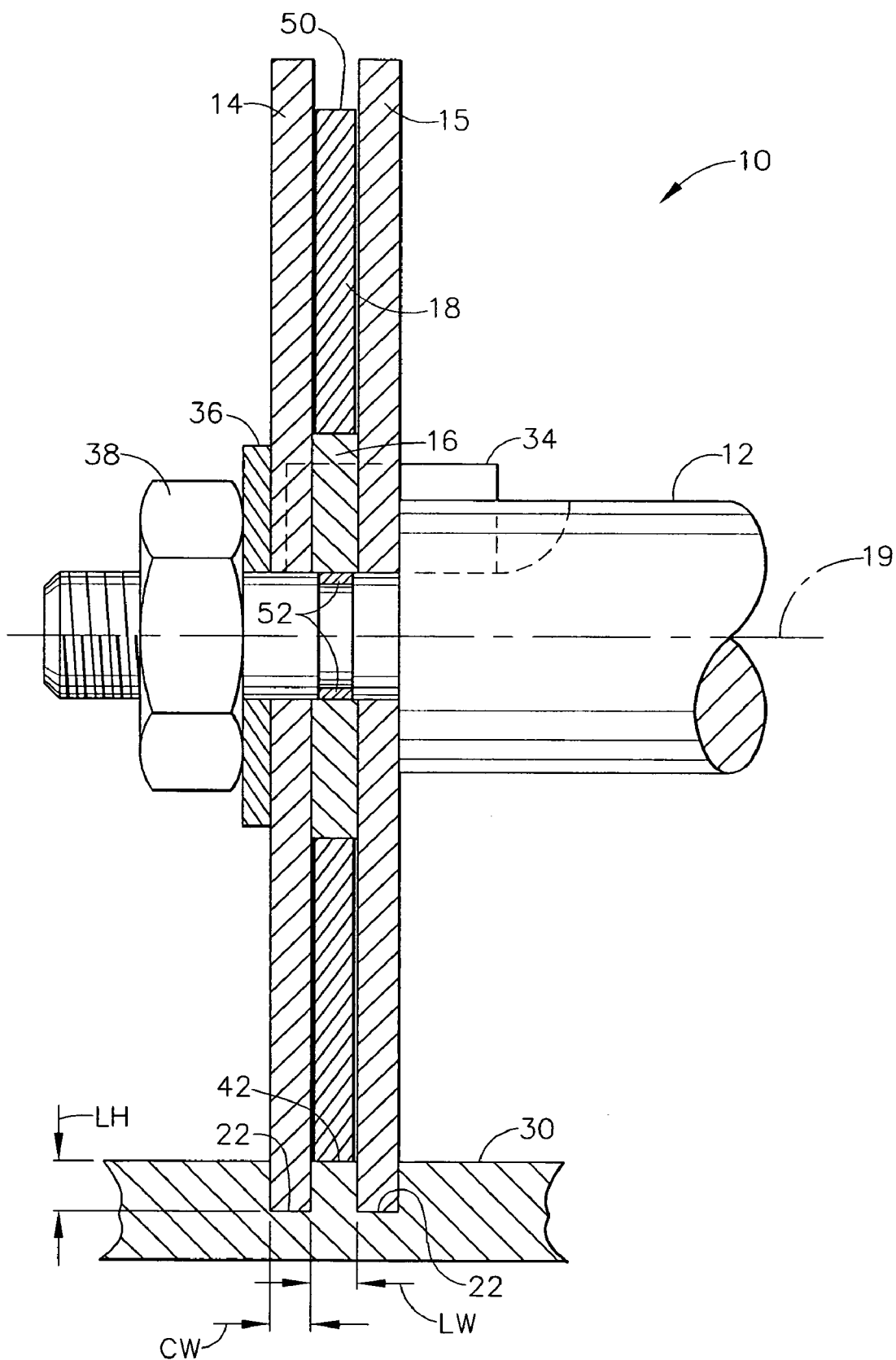
FIG. 4 is partial sectional view of the channel cutting tool of FIG. 1 cutting channels in the nozzle liner of FIG. 2.

Referring initially to FIGS. 1, 3 and 4, a channel cutting tool 10 constructed in accordance with the teachings of the present disclosure is generally shown. The cutting tool 10 may include an arbor 12 that connects to a rotating spindle of a machining tool (not shown) or a similar rotating part of a machining tool. Two slot cutting blades 14 and 15 may be fixedly mounted to the arbor 12. An inner washer 16 (shown in FIG. 3) may be fixedly mounted to the arbor 12 between the cutting blades 14 and 15 to establish a spacing of the cutting blades 14 and 15. An outer washer 18 (shown in FIG. 3), which will be also referred to herein as a depth limiting washer 18, may be rotationally mounted to the inner washer 16 between the two cutting blades 14 and 15, with the thickness of the outer washer 18 smaller than the inner washer 16 to permit freedom of relative rotation. The arbor 12 rotates about a longitudinal rotation axis 19, which may also be the rotation axis for the cutting blades 14 and 15, the inner washer 16, and the outer washer 18. Accordingly, the cutting blades 14 and 15, the inner washer 16, and the outer washer 18 may be concentrically mounted to the arbor 12. As will be described in further detail below, the outer washer 18 functions as a depth-limiting safeguard for the channel cutting tool 10.

Figure 2:
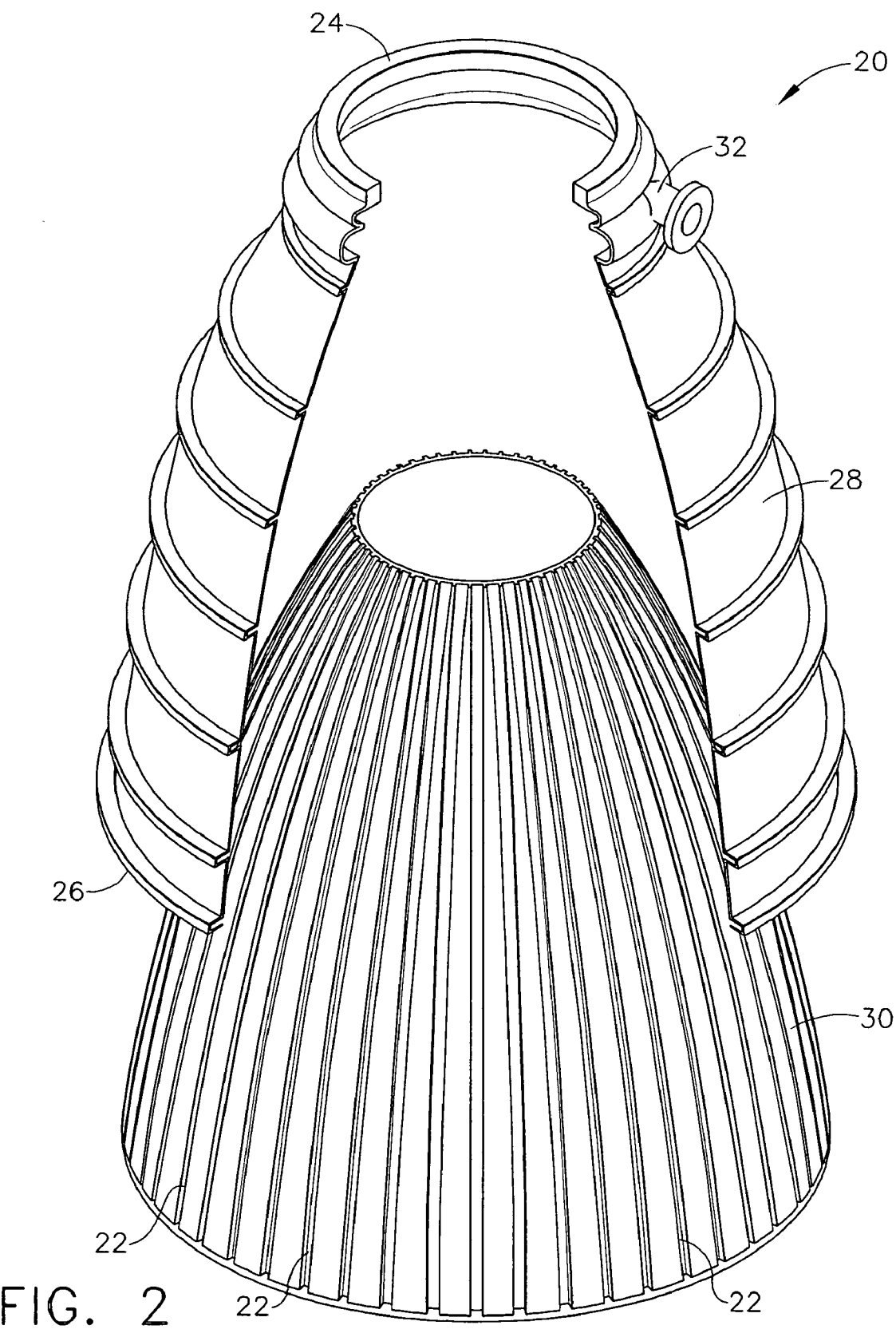
FIG. 2 is a perspective exploded view of a rocket nozzle showing a nozzle liner having channels cut with the channel cutting tool of FIG. 1.

Referring now to FIG. 2, a rocket engine nozzle 20 having channels 22, that may be manufactured by the channel cutting tool 10, is generally shown. The nozzle has a forward end 24 and an aft end 26. The nozzle 20 may include a nozzle jacket 28 and a nozzle liner 30 that is bonded to the inside of the nozzle jacket 28. The nozzle liner 30 may include the channels 22, which extend from the forward end 24 to the aft end 26. The channels 22 may be connected to each other at both the forward end 24 and the aft end 26. When the nozzle liner 30 is bonded to the nozzle jacket 28, a coolant may circulate in the channels 22 to cool the nozzle 20. To distribute and circulate the coolant in the channels 22, the nozzle jacket 28 may include a manifold 32 that may be connected to the channels 22 at the forward end 24 of the nozzle 20. Although FIG. 2 illustrates an exemplary rocket engine nozzle, the disclosed cutting tool 10 and the method of its use are equally applicable to a rocket engine combustion chamber or any other heat exchanger utilizing a channel wall construction.

Referring to FIG. 4, the cutting blades 14 and 15, and the inner washer 16 may be fixedly mounted to the arbor 12. To prevent the cutting blades 14 and 15, and the inner washer 16 from slipping when mounted to the arbor 12, the arbor 12 may include a drive key 34 that receives a corresponding drive key slot (not shown) from each of the cutting blades 14 and 15, and the inner washer 16. To secure the cutting blades 14 and 15, and the inner washer 16 on the arbor 12, a preload washer 36 may be mounted to the arbor 12 on the outer cutting blade 14, and the entire assembly of the cutting blades 14 and 15, the inner washer 16, and the preload washer 34 may then be tightened on the arbor 12 by a preload nut 38.

Each of the cutting blades 14 and 15 may have a width that is shown as CW. The width of the cutting blades 14 and 15 may be equal, as shown in the example of FIG. 4, or the width of the cutting blades 14 and 15 may be different. Although each of the disclosed cutting blades 14 and 15 is circular and has a circular cutting edge, slot cutting blades of different shapes can be used in the channel cutting tool 10. The cutting blades 14 and 15 may be separated by a distance that is shown as LW, which approximately corresponds to the width of the inner washer 16. Accordingly, during a cutting operation, when rotating cutting blades 14 and 15 penetrate the nozzle liner 30 and are moved in a channel cutting direction, each cutting blade 14 and 15 cuts the channel 22 having a width of approximately CW. Additionally, a portion 42 of the nozzle liner 30 between the cutting blades 14 and 15, which is referred to in the following as the land 42, forms a common wall for the two adjacent channels 22. Accordingly the width of the land 42 is approximately LW.

Referring to FIGS. 3 and 4, the inner washer 16 and the outer washer 18 may be mounted to the arbor 12 between the two cutting blades 14 and 15 and concentric therewith. The inner washer 16 may be fixedly mounted to the arbor 12 between the cutting blade 14 and 15, and therefore, may rotate with the cutting blades 14 and 15. The outer washer 18 may be rotationally mounted to the inner washer 16 between the cutting wheels 14 and 15. The outer washer 18 rotates relative to the inner washer 16 by slipping on the inner washer 16. To provide smooth slipping of the outer washer 18 over the inner washer 16, a lubricant may be provided between the inner washer 16 and the outer washer 18. The lubricant may be a hydraulic fluid or a cushion of air (i.e., a pneumatic lubricant). Alternately, a ball bearing (not shown) may be disposed between the outer washer 18 and the inner washer 16 to facilitate smooth slipping of the outer washer 18 over the inner washer 16.

The radius of the outer washer 18 is smaller than the radius of the cutting blades 14 and 15. As will become apparent in the following, the difference between the radius of the outer washer 18 and the radius of the cutting blades 14 and 15, may define a maximum possible cutting depth of the channel cutting tool 10. The maximum cutting depth approximately corresponds with the height of the land 42, and accordingly, it is referred to in the following as LH.

When the cutting blades 14 and 15 reach a cutting depth of approximately LH, a perimeter surface 50 of the outer washer 18 contacts the land 42. As the cutting blades 14 and 15 rotate and the channel cutting tool 10 is moved in the channel cutting direction, the outer washer 18 freely rolls on the land 42. Accordingly, the contact between the perimeter surface 50 of the outer washer 18 and the land 42 prevents the cutting blades 14 and 15 from cutting the channels 22 deeper than LH.

As described above, the slipping of the outer washer 18 relative to the inner washer 16, and hence relative to the arbor 12, provides for rolling contact between the perimeter surface 50 of the outer washer 18 and the land 42. One of ordinary skill in the art will readily appreciate, however, that other structures may provide the above-described function of the outer washer 18 and the inner washer 16. For example, the channel cutting tool 10 may not include an inner washer 16, and the outer washer 18 may be rotationally and directly mounted to the arbor 12. Accordingly, the outer washer 18 may rotate relative to the arbor 12 during a channel cutting operation. In yet another example, the inner ring of a ball bearing (not shown) may be fixedly mounted to the arbor 12, and therefore, the outer ring of the ball bearing may rotate relative to the arbor 12. Accordingly, a perimeter surface of the outer ring of the ball bearing may contact the land 42 during a channel cutting operation.

To prevent the perimeter surface 50 of the outer washer 18 from exerting excessive force on the land 42, which may cause deformation or collapse of the land 42, the channel cutting tool 10 may include one or more sensors 52 that measure a force of contact between the perimeter surface 50 of the outer washer 18 and the land 42. The signals from the sensors 52 may be provided to the machining tool that operates the channel cutting tool 10. If the signals from the sensors 52 indicate a force that exceeds a predetermined force, the machining tool may stop the channel cutting operation. An operator of the machining tool can then reposition the channel cutting tool 10 or take other appropriate action to reduce the force before continuing with the channel cutting operation. The sensors 52 may be placed anywhere on the outer washer 18, between the outer washer 18 and the inner washer 16, or on the portion of the arbor 12 where the inner washer 16 is mounted, as long as the above-described force can be measured. In FIG. 4, the sensors 52 are shown to be disposed between the inner washer 16 and the arbor 12.

The channel cutting tool 10 may be constructed with only one cutting blade or more than two cutting blades. To limit the depth of the channels being cut, however, each cutting blade of the channel cutting tool 10 may have an inner washer 16 and an outer washer 18 disposed adjacent thereto as described above. For example, a channel cutting tool 10 with only one cutting blade can cut a single channel in a part in one pass of the cutting tool 10 along the part. In yet another example, a channel cutting tool 10 with three cutting blades can cut three channels in a part in one pass of the cutting tool along the part. The number of cutting blades to be used on a channel cutting tool 10 may depend on the shape, contour, and various material characteristics of the part to be cut, as well as the characteristics of the machining tool that operates the cutting tool 10.

The channel cutting tool 10 may be used in numerous channel or slot cutting applications where the depth of the cutting should be limited. The channel cutting tool 10 can be used for cutting channels or slots in any suitable material, such as, for example, metal, plastic, or wooden parts. The channel cutting tool 10 can be manufactured in any size for attachment to a variety of light to heavy duty machining tools.

Persons of ordinary skill in the art will appreciate that, although the teachings of the invention have been illustrated in connection with certain embodiments, there is no intent to limit the invention to such embodiments. On the contrary, the intention of this application is to cover all modifications and embodiments fairly falling within the scope of the teachings of the invention.

What is claimed is:

1. A method of cutting channels in a liner of a rocket engine combustion chamber or a rocket engine nozzle, the method comprising:

cutting the liner along a channel direction at a cutting depth with a cutting tool, the cutting tool comprising a pair of rotating cutting blades, and the cutting tool comprising at least one washer disposed between the cutting blades and being concentric with the cutting blades, the washer adapted to be freely rotatable relative to the cutting blades, a radius of the washer being smaller than a radius of the cutting blades; and limiting the cutting depth by a perimeter surface of the washer contacting a portion of the liner between the channels cut by the pair of cutting blades, further comprising sensing a force of the contact between the perimeter surface of the washer and the portion of the liner between the channels with a sensor.

2. The method of claim 1, the limiting comprising the perimeter surface of the washer rolling on the portion of the liner between the channels upon contact with the portion of the liner between the channels when the cutting tool is moved in the channel cutting direction.

3. The method of claim 1, further comprising stopping the cutting when the force sensed by the sensor exceeds a force level.

4. The method of claim 1, wherein each cutting blade is a circular blade having a cutting edge.

5. The method of claim 1, wherein the cutting tool includes an arbor rotatable about a longitudinal axis and at least one cutting blade is fixedly mounted to the arbor and adapted to rotate with the arbor about the longitudinal axis.

6. The method of claim 5, wherein the at least one washer includes an inner washer that is fixedly mounted to the arbor, concentric with the cutting blade, and a depth limiting washer is mounted concentrically over the inner washer and is freely rotatable relative to the inner washer.

7. The method of claim 6, wherein the sensor is disposed between the inner washer and the arbor.

8. The method of claim 1, further comprising providing a lubricant disposed between the depth limiting washer and the inner washer.

* * * * *